(12) United States Patent
Bisson et al.

(10) Patent No.: US 6,850,319 B2
(45) Date of Patent: Feb. 1, 2005

(54) SYSTEM FOR MEASURING AND/OR DYNAMICALLY CONTROLLING POWER LOSS IN AN OPTICAL TRANSMISSION LINE, AND AN ASSOCIATED METHOD

(75) Inventors: Arnaud Bisson, Orsay (FR); Alice Michaud, Paris (FR); Emmanuel Rossi, Paris (FR); Guy Balland, Ste Genevieve des Bois (FR)

(73) Assignee: Alcatel, Paris (FR)

( * ) Notice: Subject to any disclaimer, the term of this patent is extended or adjusted under 35 U.S.C. 154(b) by 39 days.

(21) Appl. No.: 10/406,235

(22) Filed: Apr. 4, 2003

(65) Prior Publication Data

US 2003/0189699 A1 Oct. 9, 2003

(30) Foreign Application Priority Data

Apr. 8, 2002 (FR) ............................................. 02 04340

(51) Int. Cl.$^7$ ............................................. G01N 21/00
(52) U.S. Cl. ..................................................... 356/73.1
(58) Field of Search ......................... 356/73.1; 398/136, 398/158, 168, 192, 79; 385/24, 15

(56) References Cited

U.S. PATENT DOCUMENTS

| | | | |
|---|---|---|---|
| 5,466,923 A | | 11/1995 | Merletti |
| 6,366,381 B1 | | 4/2002 | Anderson |
| 6,404,527 B1 | * | 6/2002 | Jensen ........................ 398/177 |
| 6,483,617 B1 | * | 11/2002 | Roberts ........................ 398/29 |
| 6,671,466 B1 | * | 12/2003 | Banerjee et al. .............. 398/79 |

FOREIGN PATENT DOCUMENTS

| | | |
|---|---|---|
| EP | 0552937 A1 | 7/1993 |
| EP | 0782279 A2 | 7/1997 |

* cited by examiner

*Primary Examiner*—Tu T. Nguyen
(74) *Attorney, Agent, or Firm*—Sughrue Mion, PLLC

(57) ABSTRACT

An optical system dynamically measures power loss in an optical fiber (2) having an entry end (E) adapted to receive optical signals and an exit end (S) adapted to deliver the signals. The system comprises modulation means (4) upstream from the entry end (E) and adapted to modulate the amplitude of the optical signals with a low-frequency modulation signal having a modulation index inversely proportional to the input power (Pe) of the optical signals, and detection means (7) downstream from the exit end (S) and adapted to extract from the modulated optical signals primary information representative of the output amplitude of the modulation signal and to deduce from the primary information secondary information representative of a variation in the power loss in the fiber.

16 Claims, 1 Drawing Sheet

SYSTEM FOR MEASURING AND/OR DYNAMICALLY CONTROLLING POWER LOSS IN AN OPTICAL TRANSMISSION LINE, AND AN ASSOCIATED METHOD

The field of the invention is that of optical systems, to be more precise the field of measuring and/or controlling power losses in optical signal transmission lines.

BACKGROUND OF THE INVENTION

Because of their components (optical fibers, amplifiers, etc.), optical transmission lines induce power losses that degrade transmission performance and can in some circumstances lead to processing errors and even to loss of data. These optical power losses are usually related to aging of the components and/or to maintenance or repair work.

To track changing power losses it has been proposed to measure periodically the optical power of the signals at the exit end of optical fibers. That type of measurement cannot distinguish a loss induced by an optical fiber from a loss induced by an optical amplifier that feeds optical signals into the fiber.

U.S. Pat. No. 6,366,381 describes a method of remotely measuring the power at the output of a repeater which is part of a long optical link and of transmitting the measurement result to a first terminal at a first end of the link. A photodetector at the output of the repeater supplies an electrical signal representing the output power. The gain of a fiber amplifier included in the repeater is modulated to transmit the measurement result to the first terminal. The amplifier amplifies a supervisory optical signal that is sent by a second terminal located at the second end of the link. The amplitude modulation index is proportional to the measured output power. It then suffices to measure the modulation index of the supervisory signal, when it reaches the first terminal, to determine the output power of the repeater.

It has also been proposed to measure the optical power at the entry and exit ends of the fiber and to send the measurement results to a comparator module using supervisory binary signals. This necessitates a dedicated supervisory channel, which may not be available, and requires processing time that may not be suitable for dynamically adjusting the optical power.

OBJECTS AND SUMMARY OF THE INVENTION

An object of the invention is to provide a method of measuring the losses in a fiber that is free from the drawbacks previously referred to, and in particular without using a supervisory channel and so that the measurement results are not distorted if the power applied to the fiber varies because of variations in the gain of an amplifier upstream from the fiber.

To this end, the invention proposes an optical system for dynamically measuring power loss in an optical transmission line including an optical fiber having an entry end adapted to receive optical signals and an exit end adapted to deliver the signals.

The system comprises i) modulation means upstream from the entry end and adapted to modulate the amplitude of the optical signals with a low-frequency modulation signal having a modulation index inversely proportional to the input power of the optical signals, and ii) detection means downstream from the exit end and adapted to extract from the modulated optical signals primary information representative of the output amplitude of the modulation signal and to deduce from the primary information secondary information representative of a variation in the power loss in the fiber.

In this context, the expressions "input power" and "output power" respectively mean the optical power of input signals that enter the fiber at its entry end and the optical power of output or modulated signals that leave the fiber at its exit end.

Using the above optical system, changes in the power loss induced by the optical fiber can be tracked dynamically. Because the amplitude of the modulation depends on the input power, a loss induced by the fiber has an effect on the detected amplitude. In contrast, a loss induced by the amplifier does not modify the amplitude of the modulation, and consequently does not distort the measured variations in losses in the fiber, because the method varies the modulation index (the ratio of the modulation amplitude to the amplitude of the unmodulated signal) in a manner that is inversely proportional to the power of the optical signals at the entry end of the fiber. This tends to increase the amplitude of the modulation when the amplifier gain decreases and vice versa.

The detection means preferably include comparator means adapted to compare the primary information and a chosen value representative of a nominal power loss in the fiber and to deliver secondary information representative of the difference between the primary information and the chosen value. In this case, the comparator means preferably deliver secondary information representative of the amplitude of the difference or secondary information with two states, of which a first state is associated with a positive difference and a second state is associated with a negative or zero difference.

According to another feature of the invention, the system may include control means coupled to the detection means and to the exit end of the fiber and adapted to modify the power of the optical signals delivered by the exit end of the fiber as a function of any detected variation (increase) in the power loss induced by the fiber.

Accordingly, in the event of a variation (increase) in the power loss in the fiber, the system can apply a dynamic adjustment to maintain a substantially constant nominal power loss or, in other words, to compensate the increase in the optical losses of the transmission fiber completely or partially.

For example, the control means may include a variable optical attenuator (VOA) coupled to the exit end of the fiber, upstream from the detection means. Because the VOA attenuates the power of the modulated signals at the fiber exit end, the control means can request the VOA to reduce the attenuation on detecting an unauthorized increase in the power loss induced by the fiber.

So as not to degrade the signals and/or to interfere with the measurements on the next fiber portion ("span") of the transmission line, the system may include an auxiliary module adapted to eliminate from the modulated signals leaving the fiber the amplitude modulation induced by the modulation means.

The invention also proposes an installation for transmitting optical signals representative of data and including an optical transmission line comprising a plurality of optical fibers connected by optical amplifiers each delivering optical signals and coupled to an optical system as defined above and preferably delivering modulation signals at different frequencies.

The invention further proposes a method of dynamically measuring power loss in an optical transmission line comprising an optical fiber having an entry end adapted to receive optical signals and an exit end adapted to deliver the signals.

The method is characterized in that the amplitude of the optical signals is modulated with a low-frequency modulation signal having a modulation index inversely proportional to the input power of the optical signals, and then i) primary information representative of the output amplitude of the modulation signal is extracted from the modulated signals, and ii) secondary information representative of a variation in the power loss in the optical fiber is deduced from the primary information.

The primary information and a chosen value representative of a nominal power loss in the fiber are preferably compared to deliver secondary information representative of the difference between the primary information and the chosen value. The secondary information is either representative of the magnitude of the difference or has two states, of which a first state is associated with a positive difference and a second state is associated with a negative or zero difference.

According to another feature of the method, if a variation (increase) in the power loss in the fiber is detected, the power of the modulated signals delivered by the exit end of the fiber may be modified as a function of the variation that has been detected, to maintain a substantially constant loss (equal to the nominal loss).

The amplitude modulation is preferably eliminated downstream from the exit end of the fiber.

Furthermore, amplitude modulation using modulation signals with different frequencies may be applied at the entry ends of a plurality of optical fibers connected by optical amplifiers each delivering optical signals.

The system, the installation, and the method of the invention are all particularly, although not exclusively, suitable for measuring and/or dynamically controlling power losses on optical transmission lines in the field of telecommunications, especially when the lines carry wavelength division multiplexed (WDM) data channels.

BRIEF DESCRIPTION OF THE DRAWING

Other features and advantages of the invention become apparent on reading the following detailed description and examining the accompanying drawings, in which.

MORE DETAILED DESCRIPTION

The accompanying drawings are, for the most part, definitive in character. Consequently, they may contribute not only to describing the invention, but also to defining it, where appropriate.

Figure 1:
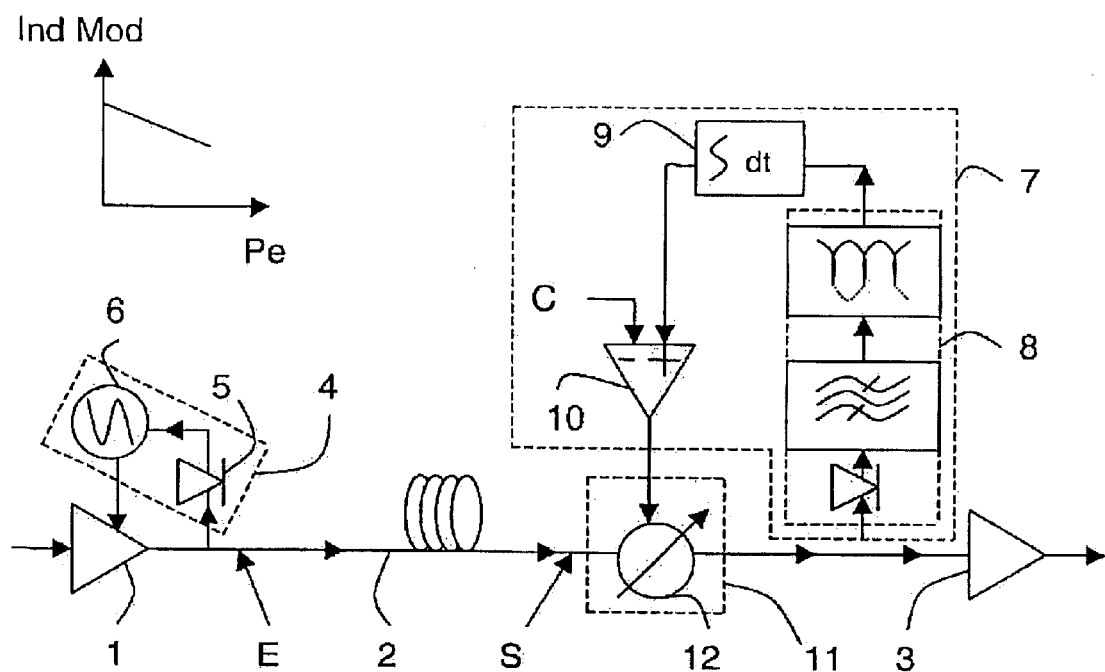
FIG. 1 is a diagram showing an embodiment of an optical system of the invention.

An embodiment of an optical system of the invention installed on a portion of a transmission line is described first with reference to FIG. 1. The transmission line portion includes an input optical amplifier 1 connected to the entry end E of an optical fiber 2 to deliver thereto optical signals carrying data to be transmitted, for example in the form of a wavelength division multiplex (WDM). In the embodiment shown, the exit end S of the fiber 2 is coupled to an output optical amplifier 3 connected to another portion of the transmission line. The nominal power loss in the optical fiber 2 is known.

The system of the invention includes a modulation unit 4. In the example shown, this unit includes an electronic circuit connected both to the output of the input amplifier 1 to sample a portion of the amplified optical signals, and to an input of the input amplifier 1 to supply thereto a low-frequency modulation signal such that the modulation index (Ind Mod) of the resulting amplitude modulation is inversely proportional to the input power Pe of the optical signals. The frequency of the modulation signal is made less than the cut-off frequency of the output amplifier 3.

To supply the modulation signal, the circuit includes a diode 5 delivering information representative of the optical power Pe of the optical signals and a generator 6 delivering a sinusoidal signal such that the amplitude modulation index Ind Mod obtained is inversely proportional to the optical power Pe of the signals, which is represented by the information delivered by the diode 5, as shown in the top left-hand portion of FIG. 1. Of course, the modulation signal generator 6 could deliver signals taking other forms.

The modulated signals flow in the fiber 2 as far as its exit end S, which they reach with an optical power Pd and where some of them are sampled, via an optical splitter, by a detector module 7 of the system of the invention.

The module 7 is adapted, among other things, to measure the amplitude of the modulation signals included in the sampled modulated signals and to deduce therefrom any variation in the power loss in the fiber 2 compared to the nominal loss.

In the non-limiting embodiment shown, the detector module 7 includes an electronic circuit 8 including a filter, preferably a band-pass filter, for selecting the modulation signal and a diode circuit for rectifying the modulated signal so that a subsequent integrator 9 can measure the amplitude of the modulation. The integrator 9 therefore delivers primary information representative of the output amplitude of the modulation signal.

Because the amplitude of the original modulation is a function of the input power Pe delivered by the input amplifier 1 upstream from the fiber 2, the measured output amplitude, and thus the primary information, is therefore also representative of the power loss induced by the fiber 2. Accordingly, knowing the nominal power loss and the measured power loss, it is possible to deduce secondary information representative of the variation in the power loss in the fiber.

Figure 2A:
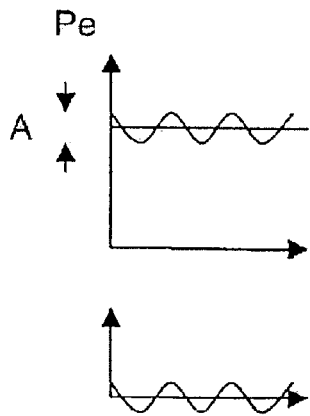
FIGS. 2A and 2B are diagrams showing examples of the power level and modulation amplitude of optical signals respectively at an entry end (Pe) and an exit end (Pd) of the fiber in the event of a power loss induced by the optical fiber, the top diagram showing the modulation amplitude with the DC component and the bottom diagram showing the modulation amplitude after eliminating the DC component.
Figure 3A:
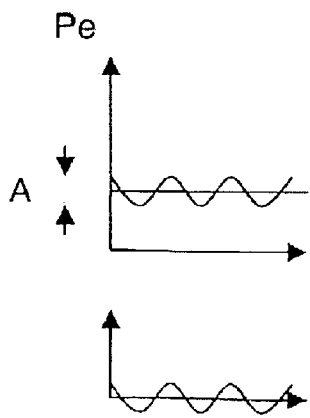
FIGS. 3A and 3B are diagrams showing examples of the power level and modulation amplitude of optical signals respectively at an entry end (Pe) and an exit end (Pd) of the fiber in the event of a reduction in the power of the optical signals delivered by the input optical amplifier, the top diagram showing the modulation amplitude after eliminating the DC component.

FIG. 2A shows the optical power Pe and the modulation amplitude A when the input amplifier 1 is operating at full power and FIG. 3A shows the same parameters when the input amplifier 1 is operating at a power 3 dB lower.

Figure 2B:
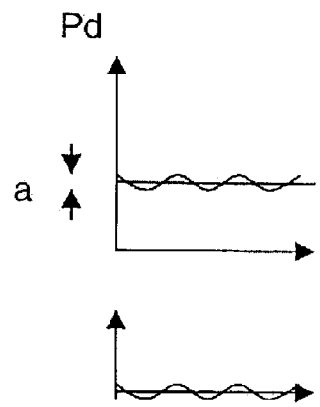

When the input power Pe has its nominal value, the amplitude of the modulation has a nominal value A and the modulation index Ind Mod also has a nominal value, for example 4%. Any variation in the power loss induced by the fiber 2 relative to the nominal loss is reflected in a reduction of the modulation amplitude from the value A to the value a, as shown in FIG. 2B.

Figure 3B:
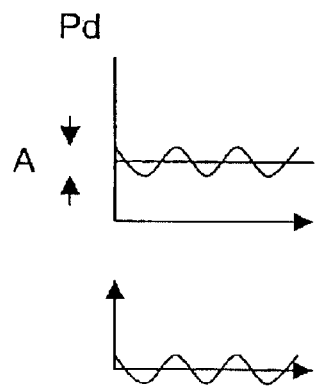

In contrast, if the optical power of the modulated signals fed into the fiber 2 is reduced because of a variation in the gain of the input amplifier 1, the modulation amplitude is maintained equal to its nominal value A since the circuit 6 increases the modulation index in an inversely proportional manner. For example, if the gain of the amplifier 1 is reduced by 3 dB, the circuit 6 increases the amplitude modulation index from 2% to 4%, which maintains the modulation amplitude at the value A, as shown in FIGS. 3A and 3B. It is apparent that the modulation amplitude at the exit end of the fiber is a measure of the losses in the fiber, and this measurement cannot be distorted by variations of the gain of the amplifier 1 upstream from the fiber. This reliable measurement can then be used to control means for compensating the variations in the power loss specific to the fiber.

The detector module 7, which knows the nominal value A of the modulation amplitude, delivers primary information representative of the real power loss in the fiber 2. The primary information is advantageously fed to the non-inverting input (+) of a comparator 10 whose inverting input (−) is fed with a set point C representative of the nominal authorized losses in the fiber 2 (for example 20 dB). The set point C therefore enables the comparator 10 to estimate the difference between the authorized nominal loss and the real loss induced by the fiber 2.

The comparator 10 therefore receives the primary information, compares it to the set point C, and delivers secondary information representative of the difference between the primary information and the set point C, in other words representative of a variation in the power loss in the fiber 2 relative to a nominal value. The secondary information can either be directly representative of the amplitude of the measured difference or take two states, of which a first state, for example "high", is associated with a positive difference and a second state, for example "low", is associated with a negative or zero difference.

The system of the invention can also adjust the power at the exit end S of the fiber 2. As shown in FIG. 1, it then includes a control module 11 including a device 12 capable of modifying the power of the modulated signals before they reach the output amplifier 3. The device 12 is a variable optical attenuator (VOA), for example, at the exit end of the fiber 2 or upstream from the input of the detector circuit 7. Consequently, the modulated signals that are sampled by the detector circuit 7 are attenuated beforehand by the VOA 12 so that if a variation (increase) in the power loss in the fiber 2 is detected the control module 11 can order the VOA 12 to reduce the attenuation (or to compensate the increase of the power loss in the fiber), which is equivalent to amplifying the modulated signals so that they return to their nominal amplitude.

Accordingly, if the comparator 10 delivers to the control module 11 secondary information in the high state, for example, the latter orders the VOA 12 to reduce the attenuation by a chosen amount, for example substantially 3 dB. As an alternative to this, if the secondary information represents the amplitude of the difference between the nominal power loss (C) of the fiber and its real power loss, the control module 11 orders the VOA 12 to reduce the attenuation by an amount substantially equal to the difference.

Thus only a variation in the power loss induced by the fiber 2 leads to an automatic adjustment of the attenuation.

Various solutions can be envisaged for preventing the amplitude modulation interfering with transmission in the transmission line. For example, the output amplifier 3 can be adapted to eliminate automatically the amplitude modulation induced by applying in turn complementary and antagonistic modulation. The system can instead include a second modulation module, just ahead of the output amplifier 3, to apply additional and antagonistic modulation to the modulated signals.

Moreover, the various portions of the transmission line fiber can be equipped with systems of the invention having different modulation frequencies to constitute an installation of the invention. This can in particular make it possible to track the path of data packets within a network and to determine remotely the various components responsible for power losses. It then becomes possible to track changes in the power losses induced by at least one of the fibers in the various portions of a transmission line.

Of course, the above modulation, detection and control circuits are described by way of illustrative example only and lend themselves to many variants and adaptations.

The invention also proposes a method of dynamically measuring the power loss in an optical transmission line including an optical fiber 2 whose entry end E can receive optical signals and whose exit end S can deliver the optical signals.

This can be achieved using the system and the installation described hereinabove. Because the main and optional functions and sub-functions of the steps of the method are substantially identical to those of the various means constituting the system, only the steps implementing the main functions of the method of the invention are summarized hereinafter.

The method includes a first step in which the optical signals are amplitude modulated with a low-frequency modulation signal that has a modulation index Ind Mod inversely proportional to the input power Pe of the optical signals, and preferably inversely proportional to the input power Pe of the primary signals, and a second step in which primary information representative of the output amplitude of the modulation signal is extracted from the modulated signals Pd at the exit end of the fiber 2, after which secondary information representative of a variation in the power loss induced by the fiber 2 is deduced from the primary information.

The method can equally include a complementary adjustment (regulation) step in which, if an unauthorized variation in the power loss induced by the fiber 2 is detected, the power Pd of the modulated signals delivered by the exit end S of the fiber 2 is modified as a function of the detected variation in the power loss.

A low-pass filter could be provided in the detection module, in parallel with the band-pass filter, to measure also the total optical power of the modulated signals at the fiber exit end.

What is claimed is:

1. An optical system for dynamically measuring power loss in an optical transmission line including at least one optical fiber (2) having an entry end (E) adapted to receive optical signals and an exit end (S) adapted to deliver said signals, which system comprises modulation means (4) upstream from said entry end (E) and adapted to modulate the amplitude of said optical signals with a low-frequency modulation signal having a modulation index (Ind Mod) inversely proportional to the input power (Pe) of the optical signals, and detection means (7) downstream from said exit end (S) and adapted to extract from said modulated optical signals primary information representative of the output amplitude of the modulation signal and to deduce from said primary information secondary information representative of a variation in the power loss in the fiber (2).

2. A system according to claim 1, characterized in that said detection means (7) comprises comparator means (10) adapted to compare said primary information to a chosen value (C) representative of a nominal power loss in the fiber and to deliver secondary information representative of the difference between said primary information and said chosen value (C).

3. A system according to claim 2, characterized in that said comparator means (10) is adapted to deliver secondary information representative of the amplitude of said difference.

4. A system according to claim 2, characterized in that said comparator means (10) is adapted to deliver secondary information with two states, of which a first state is associated with a positive difference and a second state is associated with a negative or zero difference.

5. A system according to claim 1, comprising control means (11) coupled to said detection means (7) and to the exit end (S) of the fiber (2) and adapted to modify the power of the optical signals delivered by the exit end of the fiber (2) as a function of any detected variation in the power loss induced by the fiber (2).

6. A system according to claim 5, characterized in that said control means (11) comprises a variable optical attenuator (12) coupled to the exit end (S) of the fiber (2).

7. A system according to claim 1, comprising an auxiliary module adapted to suppress the amplitude modulation applied by said modulation means (4) from said modulated signals leaving the fiber (2).

8. An installation for transmitting optical signals representative of data and including an optical transmission line comprising a multiplicity of optical fibers (2) connected by optical amplifiers (1, 3), each optical fiber adapted to deliver optical signals, which installation is characterized in that each optical fiber (2) is coupled to an optical system according to claim 1.

9. An installation according to claim 8, characterized in that the optical systems are adapted to deliver modulation signals at different frequencies.

10. A method of dynamically measuring power loss in an optical transmission line comprising an optical fiber (2) having an entry end (E) adapted to receive optical signals and an exit end (S) adapted to deliver said signals, which method is characterized by the steps of:

modulating the amplitude of said optical signals with a low-frequency modulation signal having a modulation index inversely proportional to the input power (Pe) of the optical signals, and then i) extracting primary information, representative of the output amplitude of the modulation signal, from said modulated signals, and ii) deducing secondary information, representative of a variation in the power loss in the fiber (2), from said primary information.

11. A method according to claim 10, further characterized by the step of comparing said primary information and a chosen value (C), representative of a nominal power loss in the fiber (2), to deliver secondary information representative of the difference between said primary information and said chosen value.

12. A method according to claim 11, characterized in that said secondary information is representative of the magnitude of said difference.

13. A method according to claim 11, characterized in that said secondary information has two states, of which a first state is associated with a positive difference and a second state is associated with a negative or zero difference.

14. A method according to claim 10, characterized in that the power of the modulated signals delivered by the exit end (S) of the fiber (2) is modified as a function of any variation detected in the power loss in the fiber (2).

15. A method according to claim 10, characterized in that the amplitude modulation is eliminated downstream from the exit end of the fiber (2).

16. A method according to claim 10, characterized in that amplitude modulation using modulation signals with different frequencies is applied at the entry ends (E) of a plurality of optical fibers (2) connected by optical amplifiers (1, 3), each optical fiber delivering optical signals.

* * * * *